Nov. 20, 1962  J. H. ETTINGER  3,064,826
FEEDER MECHANISM
Filed Nov. 24, 1958
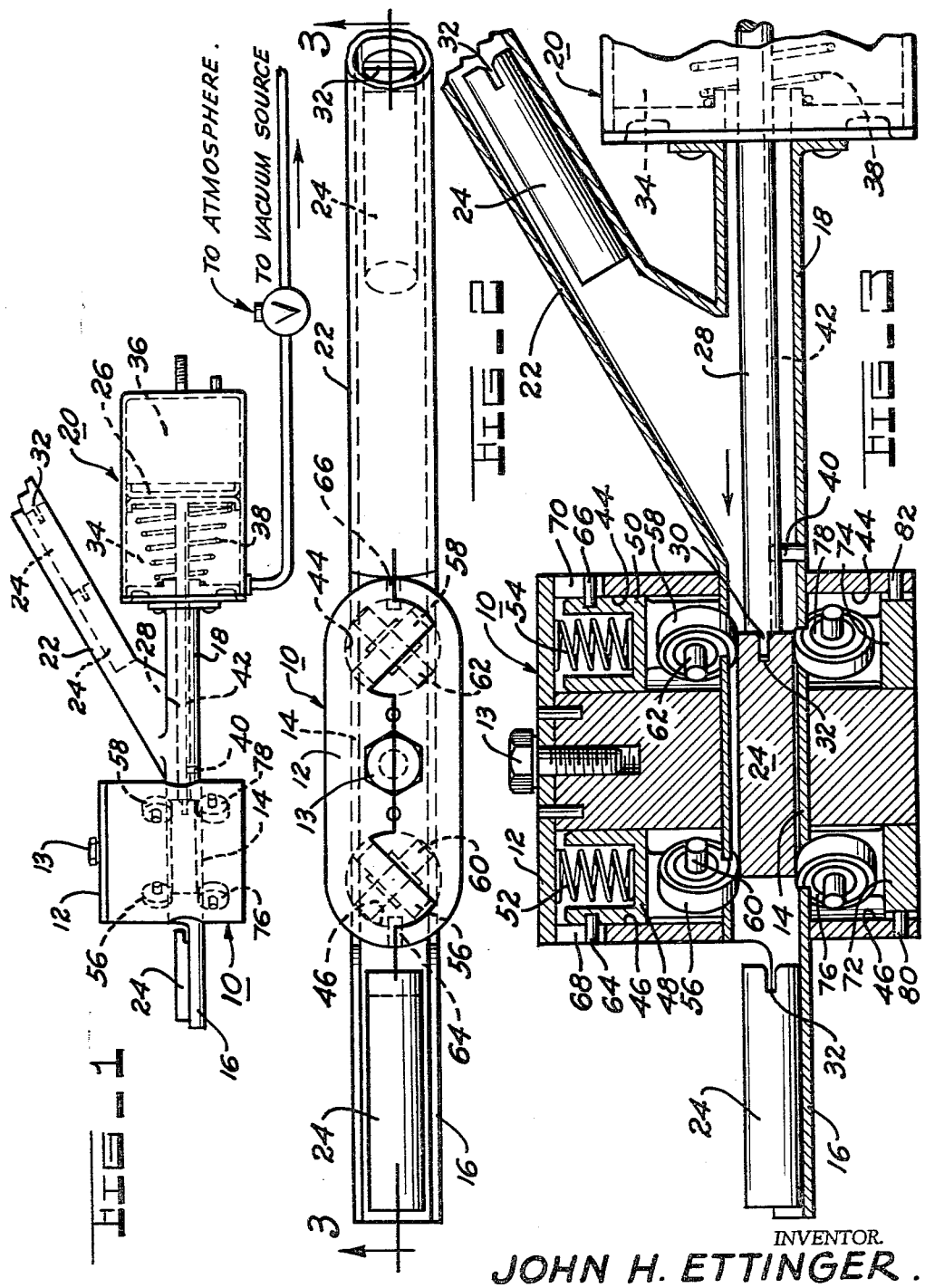
INVENTOR.
JOHN H. ETTINGER.
BY H.O. Clayton
ATTORNEY.

United States Patent Office 3,064,826
Patented Nov. 20, 1962

3,064,826
FEEDER MECHANISM
John H. Ettinger, South Bend, Ind., assignor to The Bendix Corporation, a corporation of Delaware
Filed Nov. 24, 1958, Ser. No. 775,907
7 Claims. (Cl. 214—1)

This invention relates in general to a feed mechanism such as a mechanism for feeding parts of a machine or unit in the operation of assembling said parts of the machine or unit.

My invention is, however, particularly directed to an orienting portion of said feed mechanism operable to orient workpieces, having a cylindrical external surface, to facilitate the pushing of said pieces onto, say a gripper unit, in the aforementioned operation of assembling the parts of a unit to make up the whole. For example, my orienting mechanism may feed, into a brake assembly mechanism, parts of an automotive brake unit being assembled.

It is a further object of my invention to provide an orienting mechanism, preferably a relatively compact unit, operable, during the operation of the mechanism, to align a cylindrically shaped or generally cylindrically shaped workpiece with a driver element of the mechanism; so that the configuration of said workpiece at the end thereof adjacent the driver element will mesh with the end of said element in the operation of the mechanism.

To this end my invention provides means, for example two sets of oppositely disposed and successively operable rollers frictionally contactable with the workpiece, for successively rotating the workpiece in opposite directions about its longitudinal axis; and it is an object of my invention to so position and construct said rollers as to insure the completion, by the operation of one set of rollers, of more than a certain number of degrees of rotation of the workpiece about its longitudinal axis before the initiation of operation of the second set of rollers; and before the cylindrical portion of the workpiece has bodily moved lineally a distance equal to its own length.

Other objects of the invention and desirable details of construction of parts will become apparent from the following detailed description of an illustrative embodiment of the invention, taken in conjunction with the accompanying drawing illustrating said embodiment, in which:

FIGURE 1 is a diagrammatic view disclosing the principal features of the feeder mechanism of my invention;

FIGURE 2 is a top plan view of the mechanism of FIGURE 1, and

FIGURE 3 is a sectional view disclosing, in detail, the features of my invention, said figure being taken on the line 3—3 of FIGURE 2.

There is disclosed, in the three figures of the drawing, a preferred embodiment of our invention. Referring to FIGURES 2 and 3 relatively narrow, generally parallelepiped shaped, that is boxshaped, steel casing member 10, having a detachable top member 12 secured in place by a fastening member 13, is bored to receive a tubular member 14. At one end thereof this member 14 is cut away to provide a trough shaped workpiece receiving member 16; and at its other end the tube member 14 is extended to provide a tubular shaped end piece 18 which is secured, at one of its ends, to a pressure differential operated motor 20. A tube shaped workpiece receiving chute 22 is secured, at an angle, to the member 18; and into said chute are fed the workpieces 24 handled by my feed mechanism.

The motor may be of any suitable design however I prefer a single acting vacuum motor including a piston 26 to which is secured a cylindrically shaped workpiece driver or pusher member 28. This member may include a relatively thin screw driver like end portion 30 adapted, as will be described hereinafter, to fit within a slot 32 in one end of the workpiece 24. To energize the motor 20 a three-way control valve V is opened, FIGURE 1, to connect a motor compartment 34 with a source of vacuum, not shown; and this operation will, by virtue of a vented motor compartment 36, effect a leftward movement of the piston 26 to move the driver 28 in the direction of the arrow in FIGURE 3. When the valve V is closed the compartment 34 is vented to the atmosphere whereupon a motor spring 38 operates to return the piston, and the driver connected thereto, to their off position. A pin 40, secured to the tube 18 and fitting within a slot 42 in the driver 28, serves to prevent said driver from rotating about its longitudinal axis during its axial movement.

Describing now the most important feature of my invention it is the function of the mechanism of my invention to feed the workpieces, one at a time, to either a gripper unit of an assembly mechanism, not shown, or directly into place in a unit being assembled. In this operation the driver 28 pushes the workpiece to the left, FIGURE 3. This figure discloses the driver in the act of pushing the workpiece through the tube 14; and after said workpiece has been moved into the trough 16 the motor 20 is de-energized to enable the spring 38 to return the driver to its off position. In this off position the driver 28 is positioned to the right of the position disclosed in FIGURE 3; and just as this rightward movement is completed an escapement mechanism, not shown, operates to permit another workpiece to slide down the chute 22 and into the tube 18 just ahead of the driver.

It should be noted at this juncture that my feeder mechanism is adapted to handle any one of many cylindrically shaped workpieces such as springs constituting part of an automotive wheel brake unit, steel screws, pins, etc. However, all workpieces handled by my feeder mechanism are, by virtue of the orienting mechanism constituting the essence of my invention and about to be described, moved into the trough 16 in a certain position; for this certain position is necessary in order to effect the subsequent processing of the workpiece. For example, if the workpiece is a spring member having an eye portion at its end, it is necessary that said eye portion be in a certain position when it is subsequently processed into the final assembly or by a gripper or other type of mechanical hand unit.

My invention therefore is, in the main, directed to means for orienting the workpiece, whatever it may be, as it is pushed through the tube portion 14; and by said orienting operation the male or female end portion of the workpiece, as the case may be, is meshed with the adjacent corresponding male or female end portion of the driver.

Describing now the means for orienting the workpiece as it is being pushed through the tube portion 14 the casing 10 is provided with vertically extending cylindrically shaped bores 44 and 46 the longitudinal axes of which pass through the longitudinal axis of said casing; and therefore through the longitudinal axis of the longitudinally extending workpiece receiving tube portion 14. As is disclosed in FIGURE 3 the bores 44 and 46 lie adjacent the rounded ends of the casing and house, above the tube 14, two cylindrically shaped plunger members 48 and 50. These members are provided with cylindrically shaped bores to receive, respectively, compression springs 52 and 54 operable to bias the members 48 and 50 downwardly.

The lower section of each of the plunger members 48 and 50 is provided with a transversely extending slot in which are positioned, respectively, rollers 56 and 58 rotatably mounted on pins 60 and 62 extending, at their end portions, into the body of said plunger members. As is clearly disclosed in FIGURE 3 the peripheral face of each roller extends a slight distance within the tube 14 said tube being slotted to receive said rollers. Pins 64 and 66, mounted in the top of the members 48 and 50, respectively, extend within slots 68 and 70 in the casing 10 said structure facilitating axial movement of said plunger members 48 and 50 while preventing rotational movement about their axes.

Cylindrically shaped members 72 and 74 are mounted within the lower ends of the bores 44 and 46 said members being slotted to receive rollers 76 and 78 rotatably mounted on pins mounted in the members. Set screws 80 and 82 serve, respectively, to maintain the members 72 and 74 in place axially and angularly.

The feeder unit with its orienting rollers is made up to handle a certain workpiece, say the pin 24 with its slotted end 32. Now it will be assumed that it is necessary, for the ultimate processing of said workpiece, to position the same in the trough 16 as disclosed in FIGURE 3, that is with the slot 32 extending in a laterally extending plane which is normal to the plane of the casing. It follows, therefore, that the screw driver shaped tip 30 of the driver 28 must lie in said laterally extending plane; and that the workpiece must, as it is being pushed through the tube portion 14, be oriented into a position to effect the meshing of the tip 30 with the slot 32.

The orienting operation of the workpiece, that is a rotation of the workpiece about its longitudinal axis as it is being pushed through the tube portion 14, is effected by the two sets of rollers, that is the set 58, 78 and the set 56, 76. One set of rollers serves to rotate the workpiece in a clockwise direction and the other set in a counter-clockwise direction. The angle of the roller, which may be defined as the helix angle, is a factor in determining the speed of rotation of the workpiece; and the diameter of the workpiece and length thereof dictates the helix angle necessary to rotate the workpiece the desired amount. In the case of the particular workpiece 24 shown in the drawings it is necessary, in order to mesh with the tip 30 of the driver, to rotate said workpiece slightly over 180 degrees before its direction of rotation is reversed by the set of rollers 56, 76; for occasionally the driver and workpiece do not completely mesh due to chamfer on the slot 32 and on the radius of the driver bit 30; therefore in case the two fail to mesh on the first turn they are bound to align, and therefore mesh, when the rotation is reversed by the second set of rollers. It is necessary to make the workpiece turn more than 180 degrees when moving a distance equal to its length; and this more than 180 degree turn must be completed before the second set of rollers function to grip sufficiently to reverse the direction of rotation of said workpiece.

Summing up certain features of the feeder unit of my invention, including particularly the orienting function thereof, the nature of the slot in the workpiece dictates the angle through which said workpiece must be rotated; the length of the workpiece dictates the spacing between the center lines of the two sets of rollers, the workpiece diameter and spacing between the center lines of the sets of rollers dictate the helix angle of the rollers, and the second set of rollers must be set at angles equal to but opposite the angles of the first set of rollers.

There is thus provided a feeder mechanism operable to successively feed to a desired location a plurality of like workpieces which are cylindrical in outline, each of said workpieces being, by the operation of an orienting portion of the feeder mechanism, delivered to said desired location in a certain oriented position.

While the preferred embodiment of the invention has been described in considerable detail, I do not wish to be limited to the particular construction shown which may be varied within the scope of the invention, and it is the intention to cover hereby all adaptations, modifications and arrangements thereof which come within the practice of those skilled in the art to which the invention relates.

I claim:

1. A feeder mechanism operable to successively feed, to a certain position, a plurality of like workpieces which are cylindrical or generally cylindrical in outline, said mechanism including a casing, a workpiece receiving tube member extending through said casing, a motor, including a casing and a power element, secured to said tube member, means operatively connected to said power element for pushing said workpieces through said tube member, and a plurality of sets of rollers having a horizontally spaced relationship substantially equal to the length of one of said workpieces, said plurality of sets of rollers being mounted in said first named casing and arranged to rotate the workpieces pushed through said tube member in order that the workpieces may be positioned in a certain position with respect to the pushing means and in order that the workpieces, at the end of the pushing operation, may be oriented in a certain position, said plurality of spaced apart sets of rollers including first and second freely rotatable vertically spaced rollers mounted for rotation about first and second axes, respectively, angularly disposed relative to the longitudinal axis of said workpieces, said first and second rollers being frictionally engageable with said workpieces and operable to cause rotational movement of said workpieces in one direction as the workpieces are pushed between said first and second rollers, and third and fourth freely rotatable spaced apart rollers mounted for rotation about third and fourth axes, respectively, angularly disposed relatively to the longitudinal axes of said workpieces, said third and fourth rollers being frictionally engageable with said workpieces and operable to cause rotational movement of said workpieces in the opposite direction as the workpieces are pushed between said third and fourth rollers.

2. In a feeder mechanism as claimed in claim 1 wherein said workpieces are held in frictional engagement with said first and second rollers and with said third and fourth rollers by means including resilient means operatively connected to said first and third rollers for urging said rollers radially into engagement with said workpieces, said first and third rollers being mounted for movement radially with respect to said workpieces.

3. A feeder mechanism operable to successively feed, to a certain position in a unit being assembled or to a mechanical hand, a plurality of like workpieces which are cylindrical or generally cylindrical in outline, said mechanism including a casing, a workpiece receiving tube member extending lengthwise of the casing and within the same, a workpiece receiving member protruding from one end of the casing and secured to one end of the tube member, a second workpiece receiving tubelike member protruding from the other end of the casing and secured to the tube member, a motor including a casing and a power element secured to the outer end of the tubelike member, means connected to the power element and provided with an end portion adapted to mesh with an end of the workpieces to thereby fix the rotational position of the workpieces for pushing the workpieces through the tube member and the tubelike member and into the workpiece receiving member, and means mounted in the body of the casing for rotating the workpieces as they are pushed through the tube member to facilitate meshing of said end portion with the end of the workpiece during the pushing operation so that the workpieces are positoned in the workpiece receiving member in a certain position, said last named means including a plurality of rotatable members mounted for free rotation and arranged to frictionally engage said workpieces to thereby exert a force tending to rotate said workpieces as the workpieces are pushed through said tube member.

4. A feeder mechanism operable to successively feed to a certain position a plurality of like workpieces which are cylindrical or generally cylindrical in outline, said mechanism including a relatively narrow parallelepiped shaped casing, a workpiece receiving tube member extending lengthwise of the casing and within the same, a trough member protruding from one end of the casing and secured to the tube member, a tubelike member protruding from the other end of the casing and secured to the tube member, a motor including a casing and a power element secured to the outer end of the tubelike member, means having an end portion adapted to mesh with an end of said workpiece and connected to the power element for pushing the workpiece through the tube member and tubelike member and into the trough member, and freely rotatable means mounted in the body of the casing and arranged to frictionally engage said workpiece for rotating the workpieces as they are pushed through the tube member in order that said workpiece may mesh with the end portion of the pushing means and in order that the workpiece at the end of the operation may be positioned in the trough member in a certain position, said freely rotatable means including first and second oppositely disposed rollers between which said workpiece is pushed by said power element, said first and second rollers being mounted for rotation about first and second axes, respectively, angularly disposed relative to the longitudinal axis of said workpiece.

5. A feeder mechanism operable to successively feed to a certain position a plurality of like workpieces which are cylindrical or generally cylindrical in outline, said mechanism including a relatively narrow generally box-shaped casing, a workpiece receiving tube member extending lengthwise of the casing and within the same, a trough member protruding from one end of the casing and secured to one end of the tube member, a second workpiece receiving tube member protruding from the other end of the casing and secured to the first mentioned tube member, a motor including a casing and a power element secured to the outer end of the second mentioned tube member, means having an end portion adapted to mesh with an end of the workpieces and connected to the power element for pushing the workpieces through the tube member and tubelike member and into the trough member, said end portion being operative to mesh with an end of the workpieces to thereby fix the rotational position of the workpieces, and a plurality of spaced apart sets of freely rotatable rollers mounted in the body of the casing and arranged to frictionally engage the workpieces for rotating the workpieces pushed through the first mentioned tube member to effect meshing of said end portion with the end of the workpieces and a corresponding positioning of the workpieces at the end of the operation.

6. A feeder mechanism operable to successively feed to a certain position a plurality of like workpieces which are cylindrical or generally cylindrical in outline, said mechanism including a relatively narrow box-shaped casing, a workpiece receiving tube member extending lengthwise of the case and within the same, a trough member protruding from one end of the casing and secured to one end of the tube member, a second workpiece receiving tube member protruding from the other end of the casing and secured to the first mentioned tube member, a motor including a casing and a power element secured to the outer end of the second tube member, means having an end portion adapted to mesh with an end of said workpiece and connected to the power element for pushing the workpiece through the tube member and tubular member and into the trough member, and freely rotatable means mounted in the body of the casing and arranged to frictionally engage said workpiece for rotating the same as it is pushed through the tube member in order that the workpiece may mesh with the end portion of the pushing means and in order that said workpiece at the end of the operation may be positioned in the trough member in a certain position, said freely rotatable means including two spaced apart sets of rollers mounted in the casing, each of said sets including a roller mounted in the upper portion of the casing and at a certain angle with respect to the longitudinal axis of the workpiece, and further including a roller mounted in the lower portion of the casing at a certain angle with respect to the longitudinal axis of the workpiece.

7. A feeder mechanism operable to successively feed into a certain position a plurality of like workpieces which are cylindrical or generally cylindrical in outline, said mechanism including a relatively narrow box-shaped casing, a workpiece receiving tube member extending lengthwise of the casing and within the same, a trough member protruding from one end of the casing and secured to one end of the tube member, a second workpiece receiving tube member protruding from the other end of the casing and secured to the first mentioned tube member, a motor including a casing and a power element secured to the outer end of the second tube member, a workpiece receiving chute member secured at an angle to the second workpiece receiving tube member, means having an end portion adapted to mesh with an end of the workpieces and connected to the power element for pushing the workpieces through the tube member and tubular member and into the trough member, and freely rotatable means mounted in the body of the casing and arranged to frictionally engage the workpieces for rotating the workpieces as they are pushed through the first mentioned tube in order that the end of the workpieces may mesh with the end portion of the pushing means and in order that the workpieces at the end of the operation may be positioned in the trough member in a certain position, said freely rotatable means including a first roller rotatable about an axis angularly disposed relative to the longitudinal axis of the workpieces, a second roller rotatable on an axis angularly disposed relative to the axis of said first roller and the longitudinal axis of the workpieces, and resilient means operatively connected to one of said rollers for urging the same toward the other of said rollers to thereby maintain frictional engagement between said first and second rollers and the workpieces as the workpieces pass between said first and second rollers.

References Cited in the file of this patent

UNITED STATES PATENTS

| | | |
|---|---|---|
| 715,525 | Tyberg | Dec. 9, 1902 |
| 1,998,714 | Focha | Apr. 23, 1935 |
| 2,166,608 | Postlewaite | July 18, 1939 |
| 2,503,760 | Murray et al. | Apr. 11, 1950 |
| 2,540,994 | Rogers | Feb. 6, 1951 |
| 2,742,135 | Zubay | Apr. 17, 1956 |

FOREIGN PATENTS

| | | |
|---|---|---|
| 624,158 | Germany | Jan. 14, 1936 |